United States Patent [19]
Ikeda et al.

[11] Patent Number: 5,572,680
[45] Date of Patent: Nov. 5, 1996

[54] METHOD AND APPARATUS FOR PROCESSING AND TRANSFERRING DATA TO PROCESSOR AND/OR RESPECTIVE VIRTUAL PROCESSOR CORRESPONDING TO DESTINATION LOGICAL PROCESSOR NUMBER

[75] Inventors: Masayuki Ikeda; Shigeru Nagasawa; Naoki Shinjo; Teruo Utsumi; Masami Dewa; Haruhiko Ueno; Kazushige Kobayakawa; Kenichi Ishizaka, all of Kawasaki, Japan

[73] Assignee: Fujitsu Limited, Japan

[21] Appl. No.: 109,598

[22] Filed: Aug. 20, 1993

[30] Foreign Application Priority Data

Dec. 18, 1992 [JP] Japan ................... 4-338503

[51] Int. Cl.$^6$ ................... G06F 13/00
[52] U.S. Cl. ................... 395/200.15; 395/412; 395/800; 370/94.1; 364/230.6; 364/232.1; 364/256.5; 364/260; 364/DIG. 1
[58] Field of Search ................... 395/800, 700, 395/650, 425, 400, 275, 250, 200, 841, 840, 419, 416, 413, 412, 375, 200.15, 200.08; 364/130–134; 370/53, 58.2, 58.3, 60, 67, 85.1, 92, 93, 94.1, 94.3; 371/2.2, 8.2, 11.1, 11.2, 11.3, 68.2, 68.3; 340/825.06, 825.07

[56] References Cited

U.S. PATENT DOCUMENTS

| | | | |
|---|---|---|---|
| 5,095,427 | 3/1992 | Tanaka et al. | 395/700 |
| 5,193,202 | 3/1993 | Jackson et al. | 395/800 |
| 5,210,844 | 5/1993 | Shimura et al. | 395/480 |
| 5,390,336 | 2/1995 | Hillis | 395/800 |
| 5,408,647 | 4/1995 | Landry | 395/183.13 |
| 5,446,841 | 8/1995 | Kitano et al. | 395/200.01 |

FOREIGN PATENT DOCUMENTS 2606186  5/1988  France.

OTHER PUBLICATIONS

Patent Abstracts of Japan, vol. 17, No. 602 (P–1638), Nov. 11, 1993.
Patent Abstracts of Japan, vol. 14, No. 345 (P–1083), Jul. 26, 1990.
Patent Abstracts of Japan, vol. 16, No. 296 (P–1378), Jun. 30, 1992.

*Primary Examiner*—Alpesh M. Shah
*Attorney, Agent, or Firm*—Staas & Halsey

[57] ABSTRACT

In a multiprocessor system, transfer processing sections permit transfer of data and system information among a plurality of processors in order for the processors to perform parallel processing. The system includes physical processors within which virtual processors are realized and a plurality of logical processors corresponding to a plurality of processes to be processed. In transferring data and system information, each of the transfer processing sections selects a destination logical process number corresponding to a process to be transferred and reads from main storage physical processor and within-physical-processor virtual processor numbers corresponding to the logical processor number, data and system information for transfer toward a destination. In the destination, the physical or virtual processor executes the process.

6 Claims, 18 Drawing Sheets

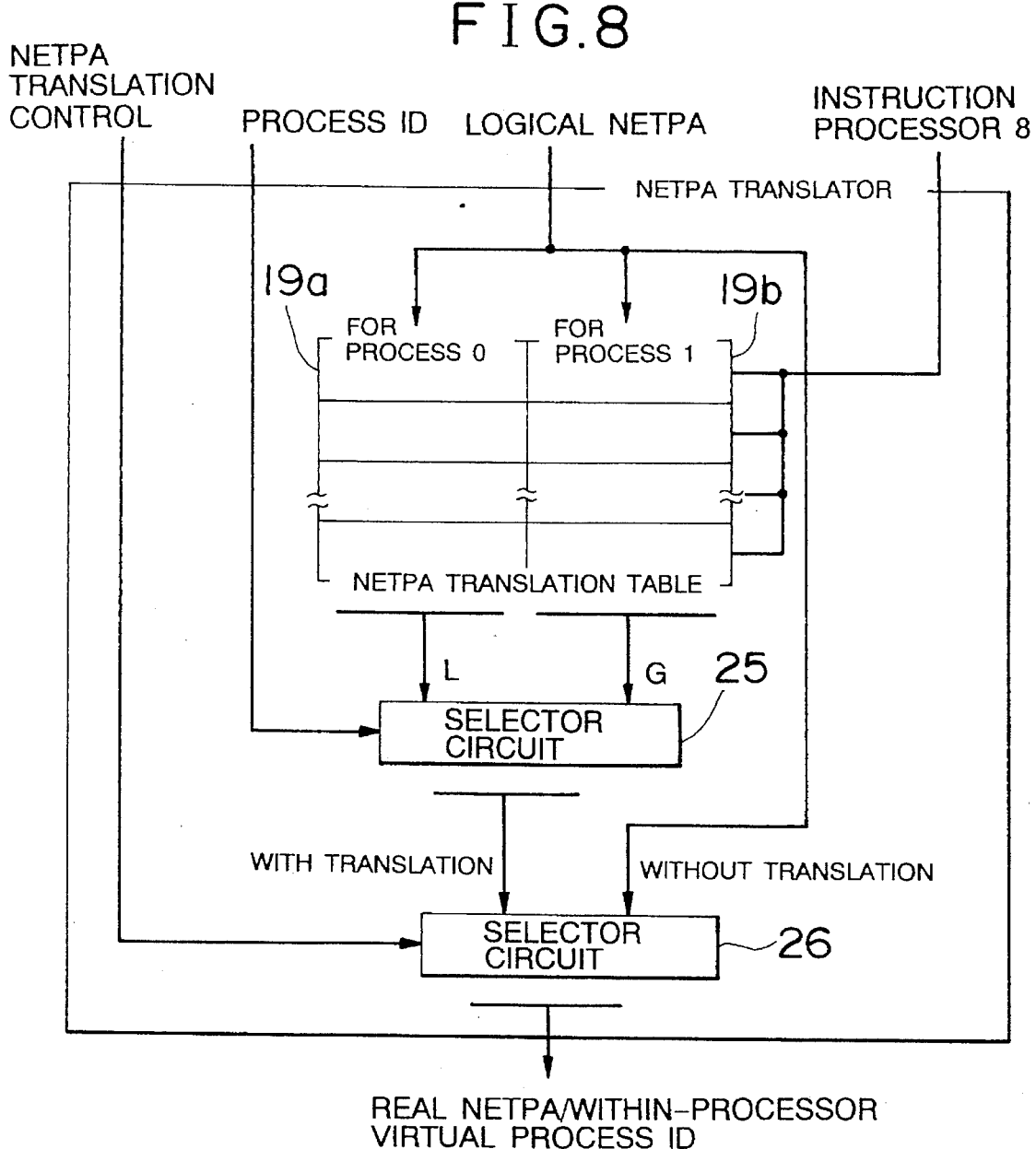

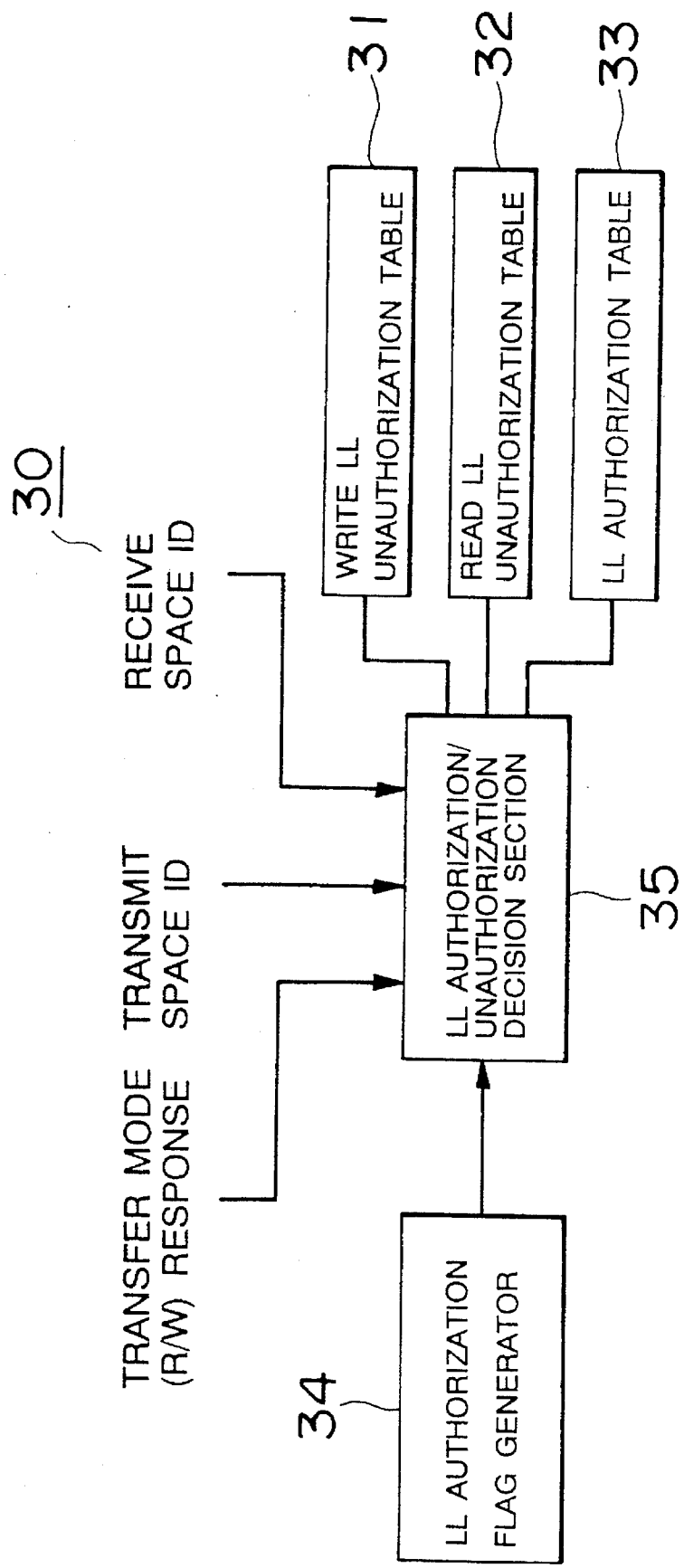

FIG. 16

WRITE LL UNAUTHORIZATION TABLE

| TRANSMITTING PROCESSOR | RECEIVING PROCESSOR | AUTHORIZATION/ UNAUTHORIZATION |
|---|---|---|
| GLOBAL | GLOBAL | AUTHORIZATION |
| GLOBAL | LOCAL | UNAUTHORIZATION |
| LOCAL | GLOBAL | AUTHORIZATION |
| LOCAL | LOCAL | UNAUTHORIZATION |

FIG. 17

READ LL UNAUTHORIZATION TABLE

| TRANSMITTING PROCESSOR | RECEIVING PROCESSOR | AUTHORIZATION/ UNAUTHORIZATION |
|---|---|---|
| GLOBAL | GLOBAL | AUTHORIZATION |
| GLOBAL | LOCAL | AUTHORIZATION |
| LOCAL | GLOBAL | UNAUTHORIZATION |
| LOCAL | LOCAL | UNAUTHORIZATION |

FIG.18

LL AUTHORIZATION TABLE

| TRANSMITTING PROCESSOR | RECEIVING PROCESSOR | AUTHORIZATION/ UNAUTHORIZATION |
|---|---|---|
| GLOBAL | GLOBAL | AUTHORIZATION |
| GLOBAL | LOCAL | AUTHORIZATION |
| LOCAL | GLOBAL | AUTHORIZATION |
| LOCAL | LOCAL | AUTHORIZATION |

REAL NETPA: RECEIVING PHYSICAL PROCESSOR NUMBER

I: INVALID BIT
-- ACCESS TO THIS ENTRY CAUSES DETECTION OF EXCEPTION

DEST PID: VIRTUAL PROCESSOR ID WITHIN RECEIVING PHYSICAL PROCESSOR, DETECT OF EXCEPTION 5,572,680

METHOD AND APPARATUS FOR PROCESSING AND TRANSFERRING DATA TO PROCESSOR AND/OR RESPECTIVE VIRTUAL PROCESSOR CORRESPONDING TO DESTINATION LOGICAL PROCESSOR NUMBER

BACKGROUND OF THE INVENTION

1. Field of the Invention

The present invention relates to a virtual processor system which is characterized by data communications among processors in a multiprocessor system such as a parallel computer system, and more particularly to a data transfer processing method and apparatus for data communications among processors for parallel processing.

2. Description of the Related Art

The demand for high-speed, large-capacity computer systems is increasing in recent years. This involves a parallel processing technique in which a plurality of processors are provided and processing is distributed over these processors for parallel processing.

Thus, multiprocessor systems have been proposed in which a plurality of processors perform parallel processing. In the multiprocessor systems, the processors operate in parallel while each processor communicates with others over a communication network, allowing all the processors to perform coherent processing. This will speed up processing required for a job.

In communications between processors in such a multiprocessor system, when transferring data existing in a storage area of the main storage of a processor A to a processor B, a supervisor program generally manages the queuing of data transfers to the processor B. When a user program generates an interruption for a data transfer request to the supervisor program, the supervisor program creates the header of a transfer packet to make a data transfer request.

With this method, however, the user program may generate many interruptions to the supervisor program, increasing system overhead. To reduce overhead resulting from supervisor program intervention, a method has been proposed which transfers data without using a supervisor program. This method will be described below.

A transfer request queue includes a write pointer and a read pointer which are directly managed by a user program. Virtual space is set aside within the main storage, and the user program makes access to the main storage by referring to an address translation table for translation between virtual and real addresses, thereby performing data transfer processing.

However, even this method cannot achieve the following function:

(1) To execute a program prepared and compiled to run on a number n of processors on m (less than n) processors in case where, for example, several processors are disconnected in the event of a processor failure; or (2) To transport a program developed for n processors to a parallel computer system having m (less than n) processors on an object level and execute it.

A conventional multiprocessor system has the following problems.

When the contents of the address translation table of a processor are changed, the contents of the address translation tables of the other processors must be updated correspondingly. In this case, an operating system (OS) performs synchronous processing. This synchronous processing is to suspend processing until all the address translation tables are updated and to perform the next processing when all the address translation tables have been updated. The synchronous processing increases the overhead of the operating system, degrading the system performance.

SUMMARY OF THE INVENTION

It is therefore an object of the present invention to provide a virtual processor system which permits a program prepared for processors larger in number than actually existing processors to be executed.

It is another object of the present invention to provide a data transferring method and apparatus which permit the overhead for data transfer in a multiprocessor system to be reduced.

A multiprocessor system according to the present invention comprises a plurality of physical processors and a communication system. Each of the processors has data storage and performs processing. The communication system permits transfer of data and system among the processors. The physical processors perform processing in parallel.

In system information storage, process IDs (identifiers) for identifying a plurality of processes which make up a user program to be executed, destination logical processor numbers and access information indicating attributes for accessing the data storage in the same processor and data storage in the other processors are stored associated with data.

The data storage is, for example, main storage. The system information storage is placed in the main storage and the system information storage stores a transfer queue, for example.

A plurality of processor translating sections translating the logical processor numbers stored in the system information storage to physical processor numbers and virtual processor numbers in correspondence with the process IDs.

A transfer control section is responsive to a real address from the address translating section to read data from the data storage and transfers it to another processor together with the access information and space distinguishing information.

In transferring data from a processor A to another processor B, the multiprocessor system associates the logical processor number of the receiving processor B with a physical processor number and a within-physical-processor virtual processor. Such a multiprocessor system permits a program compiled on the assumption that it will be run on n processors to be run on m(<n) physical processors.

BRIEF DESCRIPTION OF THE DRAWINGS

FIG. 8 is a block diagram of the NETPA translation section in the system of FIG. 3;

FIG. 15 is a block diagram of the LL authorization control section in the system of FIG. 3;

FIG. 16 shows the contents of the write LL unauthorization table in the system of FIG. 3;

FIG. 17 shows the contents of the read LL unauthorization table in the system of FIG. 3;

FIG. 18 shows the contents of the LL authorization table in the system of FIG. 3;

DETAILED DESCRIPTION OF THE PREFERRED EMBODIMENTS

Hereinafter the embodiments of the present invention will be described with reference to the accompanying drawings.

[Embodiment 1]

Figure 1:
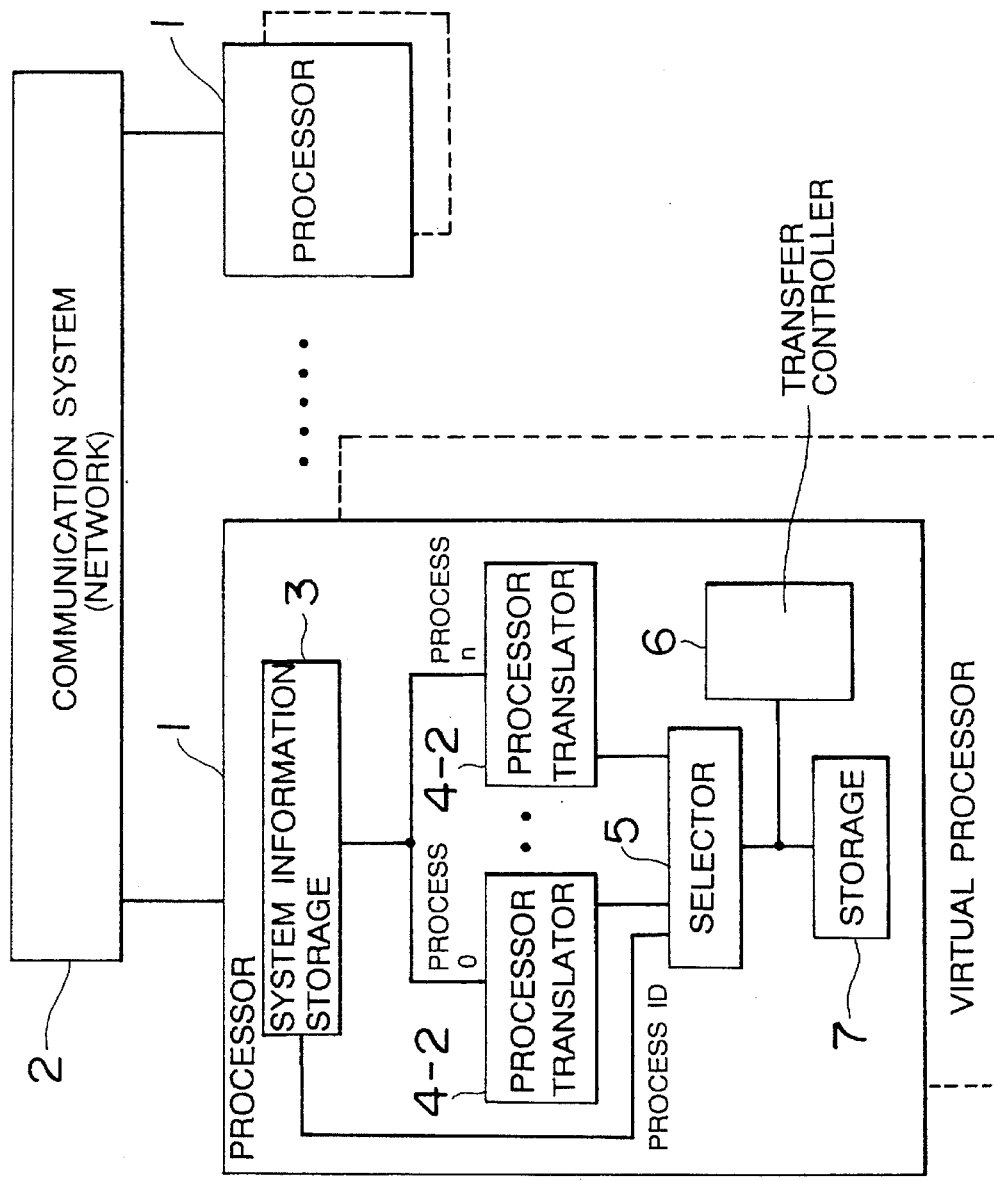
FIG. 1 is a basic block diagram of a multiprocessor system according to a first embodiment of the present invention.
Figure 2:
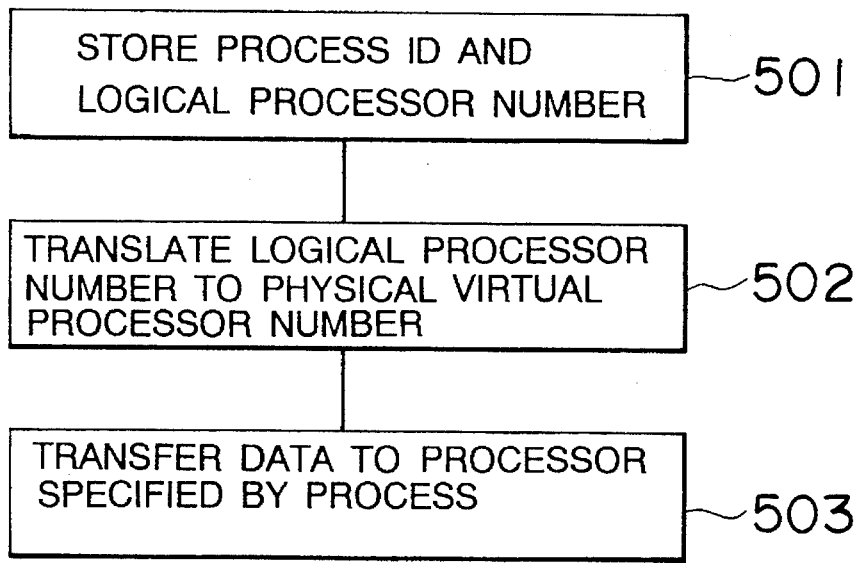
FIG. 2 is a flowchart illustrating the operation of the system of FIG. 1.

FIG. 1 is a basic block diagram of a multiprocessor system configured as a virtual processor system including a data transfer processing device of the present invention, and FIG. 2 is a flowchart for the basic operation of the multiprocessor system of FIG. 1.

The multiprocessor system of the present invention includes a plurality of processors (i.e., physical processors) 1 and a communications system 2. Each of the processors 1 is provided with a data storage section 7 and carries out predetermined processing. The communications system 2 transfers data and system information among the processors 1.

The processors 1 execute the predetermined processing in parallel. Each processor includes a system information storage section 3, a plurality of processor translation sections 4-2, a selector section 5, a transfer control section 6, and the data storage section 7.

In the system information storage section 3 of each processor, process IDs (identifiers) for identifying a plurality of processes which make up a user program to be run, logical processor numbers of processors 1 to which data is to be transmitted, and access information indicating attributes for accessing the data storage section 7 in the same processor and the data storage sections 7 in the other processors 1 are each stored associated with data.

The data storage section 7 is, for example, main storage, and the system information storage section 3 is, for example, a transfer queue table stored in an area of the main storage.

The processor translation sections 4-2 translate the logical processor numbers stored in the system information storage section 3 to physical processor numbers and virtual processor numbers in correspondence with the process IDs.

The transfer control section 6 reads data from the data storage section 7 on the basis of physical and virtual processor numbers translated by the processor translation sections 4-2 and selected by the selector section 5 and transfers it to the other processors according to the physical and virtual processor numbers.

In the data transfer processing in the system of FIG. 1, as indicated in the flowchart of FIG. 2, each processor operates in parallel to perform predetermined processing while data and system information are being transferred among the processors 1.

In information storing step 501, process IDs for identifying a plurality of processes which make up a user program to be run, logical processor numbers of processors 1 to which data is to be transmitted, and access information indicating attributes for accessing the data storage section in the same processor and the data storage sections in the other processors are stored, associated with data to be transferred, in the system information storage section 3.

In processor number translating step 502, the logical processor number of a processor to which data is to be transmitted is translated to physical and virtual processor numbers for each process.

In transfer control step 503, data is read from the data storage section 7 and then transferred to a physical processor and/or a virtual processor together with the access information.

In translating a logical processor number to physical and virtual processor numbers, two or more translation tables provided for processes can be used.

In each translation table, a physical processor number, a physical processor valid-bit flag, a virtual processor number and a virtual processor valid-bit flag are associated with the logical processor number of each logical processor.

Data is transferred to the destination processor on the basis of the physical processor number or the virtual processor number translated by the translation table. In this case, the transfer is suspended when the valid-bit flag indicates invalid.

Figure 22:
FIG. 22 illustrates the contents of the NETPA translation table in the system of FIG. 3.

Which of the results of translation by the translation tables is to be used is, as shown in FIG. 1, determined by the selector section 5 which refers to a processor selecting ID (refer to FIG. 22) indicating a physical processor and a virtual processor.

In the multiprocessor system described above, when data is transferred from a processor A to a processor B, the logical processor number of the receiving processor B is associated with the physical and virtual processor numbers within the physical processor. Such a multiprocessor system permits a program that is compiled so that it will be run in parallel on n processors to be run on m (<n) physical processors.

That is, with the system, by associating the logical processor number (referred to as "logical NETPA") of a receiving processor with a physical processor number (referred to as "real NETPA"), the virtual processor within the physical processor (referred to as "DUPID"), and valid bit information of the virtual processor within the physical processor, it becomes possible to perform effective processor-to-processor data transfer required to execute a program, which has been assumed to be run in parallel on n processors, using m (<n) physical processors.

[Embodiment 2]

<Configuration>

Figure 3:
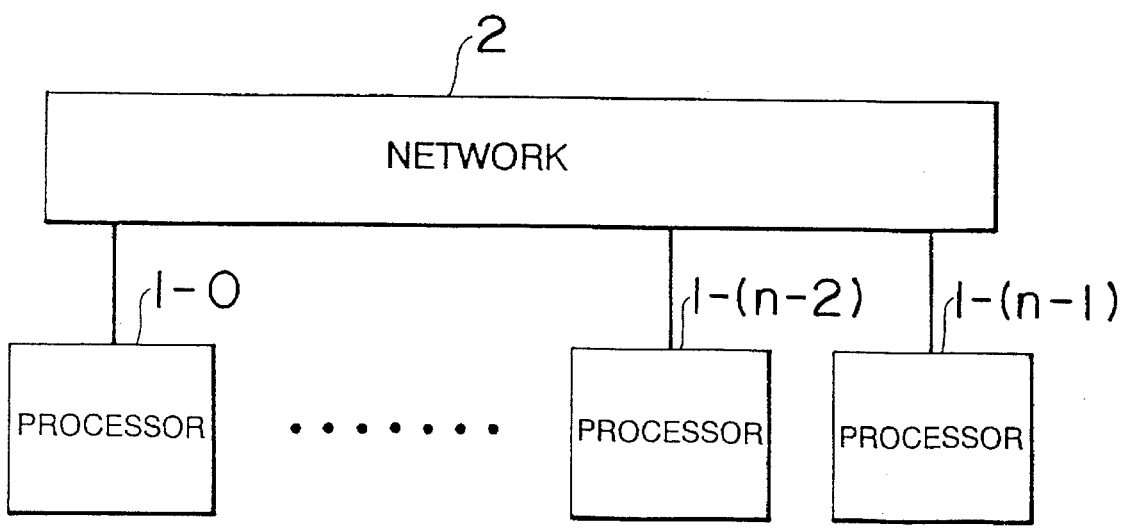
FIG. 3 is a block diagram of a multiprocessor system according to a second embodiment of the present invention.

FIG. 3 is a block diagram of a second embodiment of a multiprocessor system configured as a virtual processor system including a data transfer processing device of the present invention.

The multiprocessor system includes a plurality of processors 1-0 to 1-(n-1) (hereinafter described simply as processors 1) and a network 2 as shown in FIG. 3. The processors 1 carry out predetermined processing. The network 2 connects the processors with one another. The processors 1 communicate data with one another over the network 2.

Figure 4:
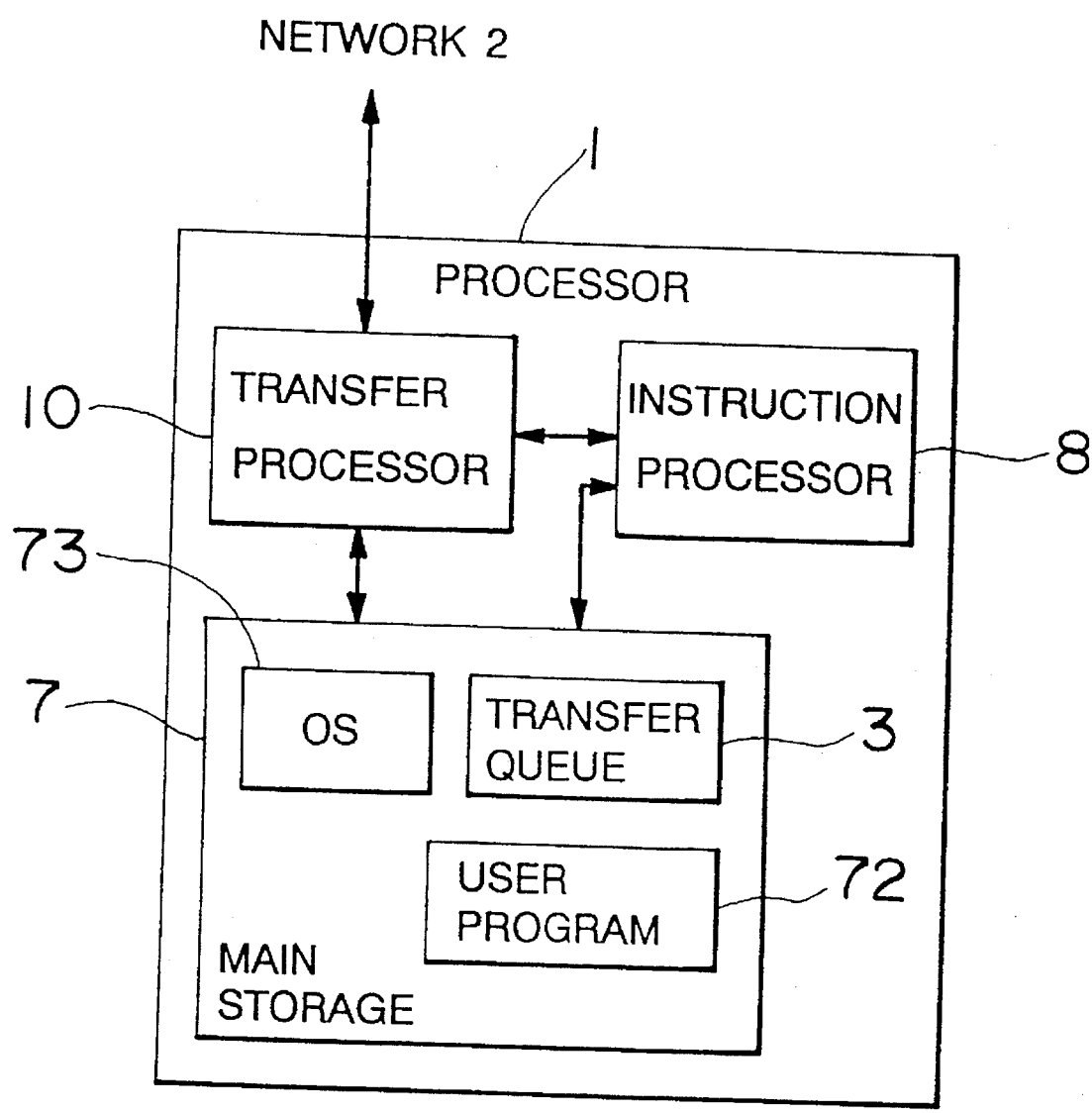
FIG. 4 is a block diagram of each processor in the system of FIG. 3.

Each of the processors 1 is, as shown in FIG. 4, provided with main storage 7, an instruction processing section 8, and a transfer processing section 10.

[Main Storage]

The main storage 7 stores a user program 72 that is made up by a plurality of instructions and data. A transfer queue 3 into which packet headers including information for transferring data packets have been entered in sequence is placed in the main storage 7. The headers placed in the transfer queue 3 include access information indicating access attributes for accessing the main storage 7 placed in data transmitting processors and the main storage 7 placed in data receiving processors.

An operating system (OS) (or a supervisor program) 73 is stored in the main storage 7, which is a program for supporting the execution of the user program 72 that is likewise stored in the main storage 7. The operating system 73 functions before the user program 72 is run or functions dynamically as requested by the user program 72 to place NETPA translation information in the NETPA translation table within a NETPA translation section 18. The user program 72 writes receiving processor specification (logical NETPA), a body data length, a transmitting address, a receiving address, a transmission space ID, a receiving space ID, and some other control information for transfer request (hereinafter referred to as control information for transfer request) into main storage locations indicated by the transfer queue base address+transfer queue write pointer×header length in the form of a packet header. The user program 72 next increments the transfer queue write pointer. The user program 72 subsequently repeats the writing of the control information for transfer request into the transfer queue and the incrementing of the transfer queue write pointer, thereby terminating the enqueuing.

The operating system 73 stores address translation information of, for example, 32 bits into each of entries of an address translation table 4 to be described later prior to execution of instructions of the user program 72.

Figure 5:
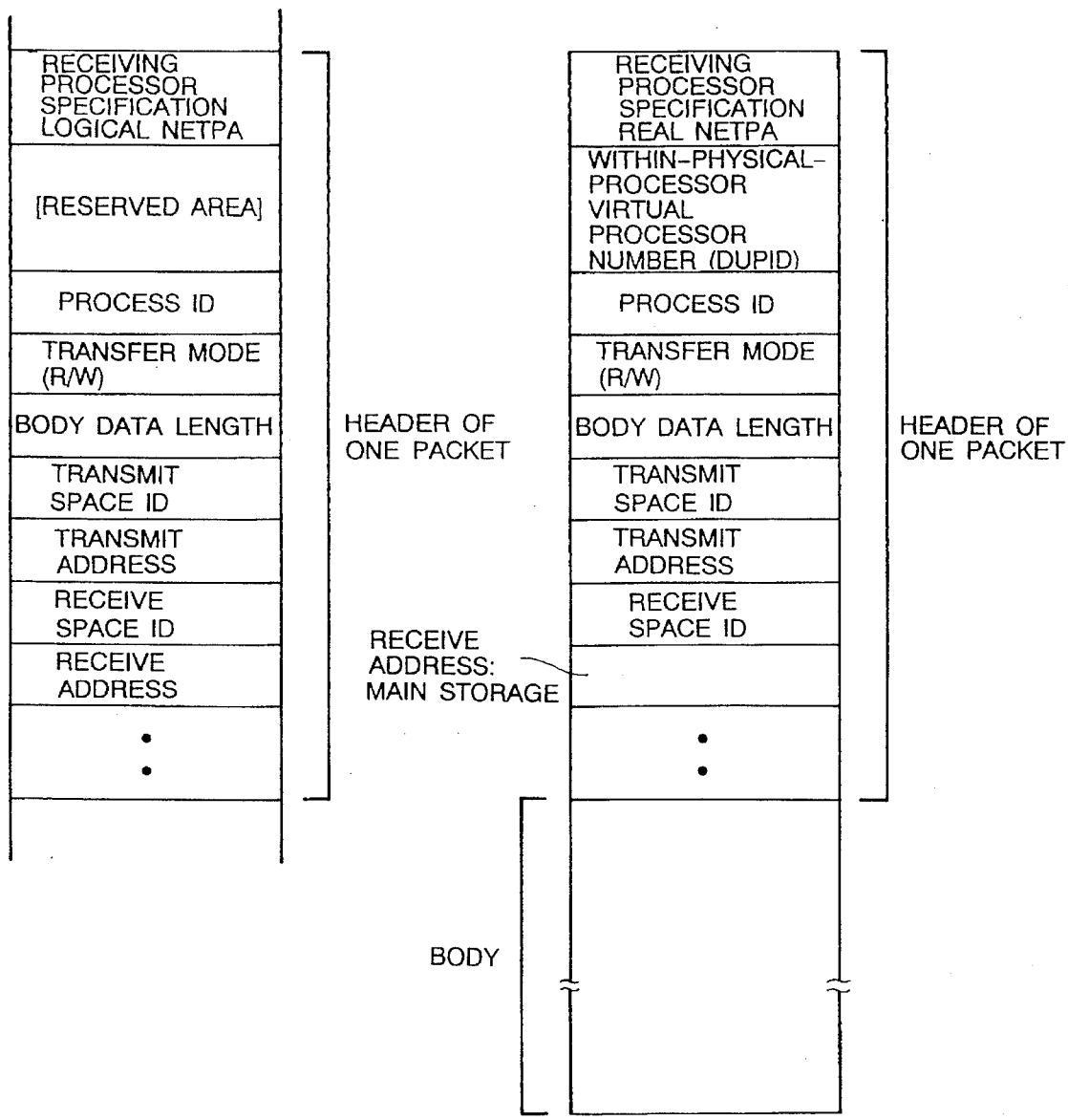
FIG. 5 shows an arrangement of a transfer queue in the system of FIG. 3.

FIG. 5 is a diagrammatic representation of a configuration of the transfer queue 3.

The transfer queue 3 stores at least one packet header which is for a packet to be transferred. The one-packet header includes information on receiving processor specification (logical NETPA), reserved area, process ID, transfer mode, body data length, transmission space ID, transmitting address, receiving space ID, and receiving address.

The "receiving processor specification" information indicates the number of a logical processor (logical NETPA) which should receive data. The "process ID" information is an ID which identifies a plurality of processes that make up the user program 72. The "transfer mode" information indicates that the transfer mode is a data read mode (R) or a data write mode (W). The "body data length" information indicates the length of body data specified by the header in terms of the number of bytes. The "transmit address" information indicates the address of transmit data stored in the sending-side main storage 7. The "receive address" information indicates the address of data to be stored in the receiving-side main storage 7. The "transmit space ID" information is an ID which distinguishes between global transmission space and local transmission space, which will be described later in detail. Note that a packet is composed of a header and body data specified by this header.

As shown in FIG. 5, in transferring data according to the transfer queue, the logical NETPA is translated to real NETPA as will be described later, and the virtual processor number is stored in the reserved area.

[Instruction Processing Section]

The instruction processing section 8 is connected to the main storage 7 and calls instructions from the program in the main storage into execution.

The instruction processing section 8 refers to and/or updates values in a transfer queue base pointer section 14, transfer queue read pointer sections 15-1 and 15-2, and transfer queue write pointer sections 16-1 and 16-2.

[Transfer Processing Section]

The transfer processing section 10 is connected with the main storage 7 and the instruction processing section 8 and transfers the above-described packet between the main storage 7 and the network 2.

Figure 6:
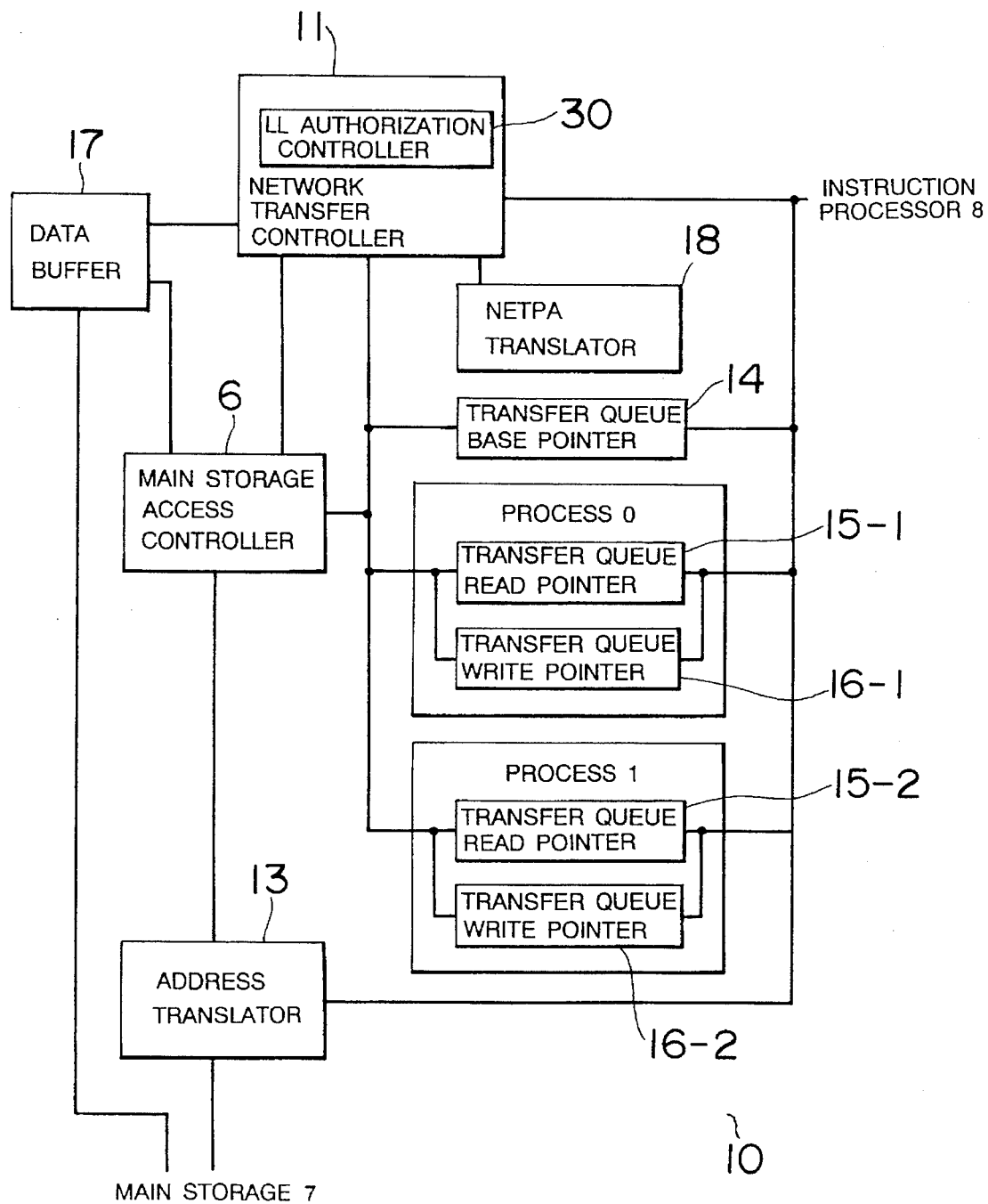
FIG. 6 is a block diagram of the transfer processing section in the system of FIG. 3.

FIG. 6 is a block diagram of the transfer processing section 10. The transfer processing section includes a network transfer control section 11, a main storage access control section 6, an address translation section 13, a transfer queue base pointer section 14, a transfer queue read pointer section 15-1, a transfer queue write pointer section 16-1, a transfer queue read pointer section 15-2, a transfer queue write pointer section 16-2, a data buffer 17, and a NETPA translation section 18.

Figure 7:
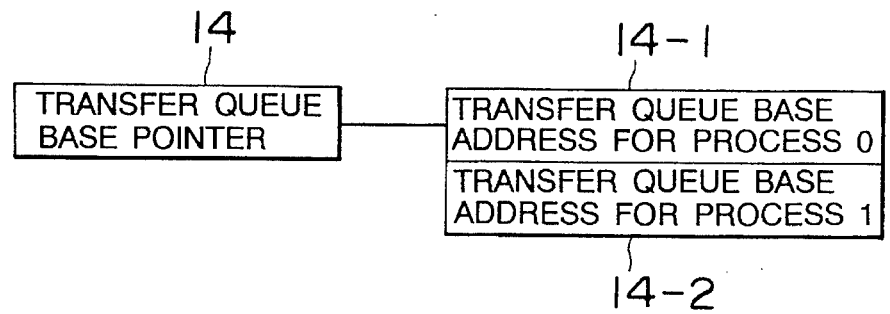
FIG. 7 is a block diagram of the transfer queue base pointer section in the system of FIG. 3.

The transfer queue base pointer section 14 communicates information to two transfer queue base address sections 14-1 and 14-2 as shown in FIG. 7. Each of the transfer queue base address sections 14-1 and 14-2 is a register which holds the starting address of the transfer queue 3 on the main storage 7. The address section 14-1 is adapted for the process 0 in the user program 72, while the address section 14-2 is adapted for the process 1 in the user program.

Each of the transfer queue read pointer sections 15-1 and 15-2 is a register which holds a pointer that indicates a position in the transfer queue 3 up to where transfer has been made by the network transfer control section 11.

Each of the transfer queue write pointer sections 16-1 and 16-2 is a register which holds a pointer that indicates a position in the transfer queue 3 up to where access information (that is, requests to transfer) has been enqueued by the instruction processing section 8.

The transfer queue read pointer sections 15-1 and 15-2 and the transfer queue write pointer sections 16-1 and 16-2 are provided in pairs in correspondence with processes to be processed in parallel. That is, the transfer queue read pointer section 15-1 and the transfer queue write pointer section 16-1 are used for the process 0 in the user program, while the transfer queue read pointer section 15-2 and the transfer queue write pointer section 16-2 are used for the process 1 in the user program.

The data buffer 17 stores data temporarily when data is transferred between the main storage 7 and the network 2 and when the network transfer control section 11 and the main storage access control section 6 read from or write into the main storage 7. A packet stored in the data buffer 17 is sent out onto the network 2.

The NETPA translation section 18 switches between processors on the basis of processor numbers, i.e., network port addresses (NETPA).

The NETPA translation section 18 is, as shown in FIG. 8, constructed from a NETPA translation table 19, and first and second selector circuits 25 and 26. The NETPA translation table 19 can be written or updated by the instruction processing section 8. The NETPA translation table 19 comprises a process-0 NETPA translation table 19a and a process-1NETPA translation table 19b. The first and second selector circuits 25 and 26 search the NETPA translation table 19.

The logical NETPA from the network transfer control section 11 searches the NETPA translation table 19 for an entry in the process-0 NETPA translation table 19a and an entry in the process-1 NETPA translation table 19b, the entries being read out.

The process ID specified by the network transfer control section 11 is entered into the first selector circuit 25, which thus selects one of the two entries (L, G).

A NETPA translation control signal is applied to the second selector circuit 26, which thus selects either the output (NETPA translated output) of the first selector circuit 10 or the logical NETPA (untranslated NETPA).

That is, when the NETPA control signal instructs translation, the output (NETPA translated output) of the first selector circuit 25 is selected, while, when the NETPA control signal instructs no translation, the logical NETPA (untranslated NETPA) is selected. The output of the second selector circuit is used as the NETPA for a destination and a virtual process ID in a receiving processor.

The network transfer control section 11 is activated by a command from the instruction processing section 8 to wait for enqueuing of transfer requests. When pointer values in the transfer queue read pointer sections 15-1 and 15-2 become unequal to pointer values in the transfer queue write pointer sections 16-1 and 16-2, respectively, outstanding transfer requests are considered to remain, so that data transfer processing is started. The network transfer control section 11 issues a main storage access request to the main storage access control section 6 to read the header of a packet to be transferred and body data.

The main storage access control section 6 makes access to the main storage 7 in accordance with the access request from the network transfer control section 11 and controls the transfer of a packet between the main storage 7 and the data buffer 17.

That is, the main storage access control section 6 computes the main storage address of a packet header, on which the oldest outstanding transfer request was made, from the transfer queue base address and the transfer queue read pointer and then makes read access to the main storage via the address translation section. When the packet header is read out of the main storage, the main storage access control section stores it in the data buffer and informs the network transfer control section of the termination of reading of the packet header.

The address translation section 13 makes address translation on the basis of the main storage access space ID value specified by the header and provides an access address for the main storage.

Figure 9:
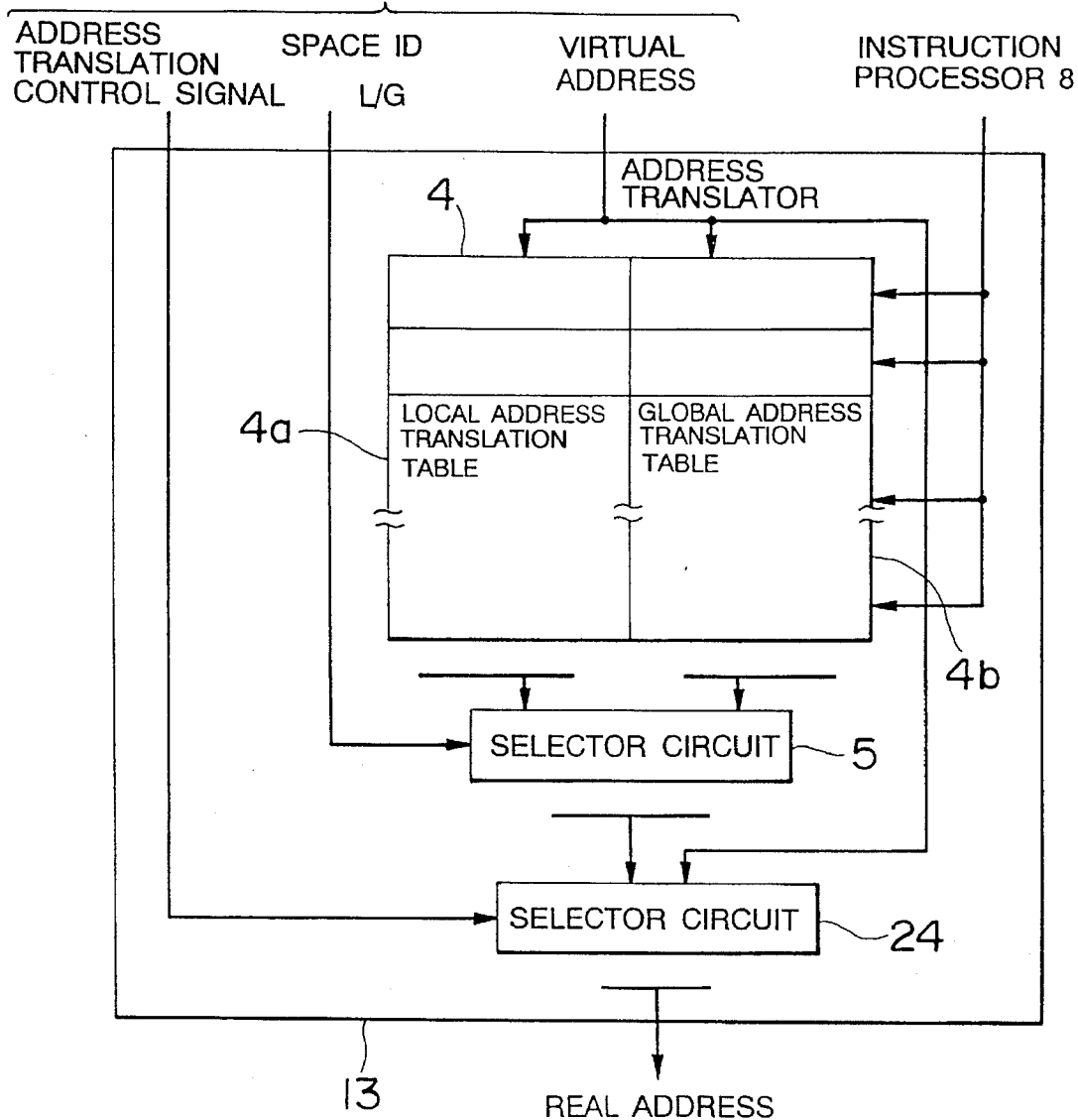
FIG. 9 is a block diagram of the address translation section in the system of FIG. 3.
Figure 11:
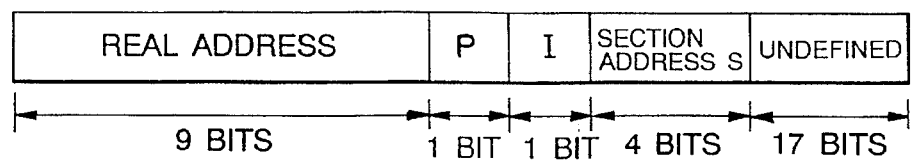
FIG. 11 is a diagrammatic representation of the contents of the address translation table in the system of FIG. 3.

FIG. 9 is a block diagram of the address translation section 13.

The address translation section 13 translates virtual addresses (logical addresses) to real addresses (physical addresses) and is provided with an address translation table 4, a selector circuit 23 and a selector circuit 24.

The address translation table 4 has a local address translation table 4a and a global address translation table 4b. The local address translation table 4a corresponds to transmit space ID=0 and translates virtual addresses to real addresses so as to permit access to local space inherent in each processor. The global address translation table 4b corresponds to transmit space ID=1 and translates virtual addresses to real addresses so as to permit access to global space shared with processors.

Figure 10:
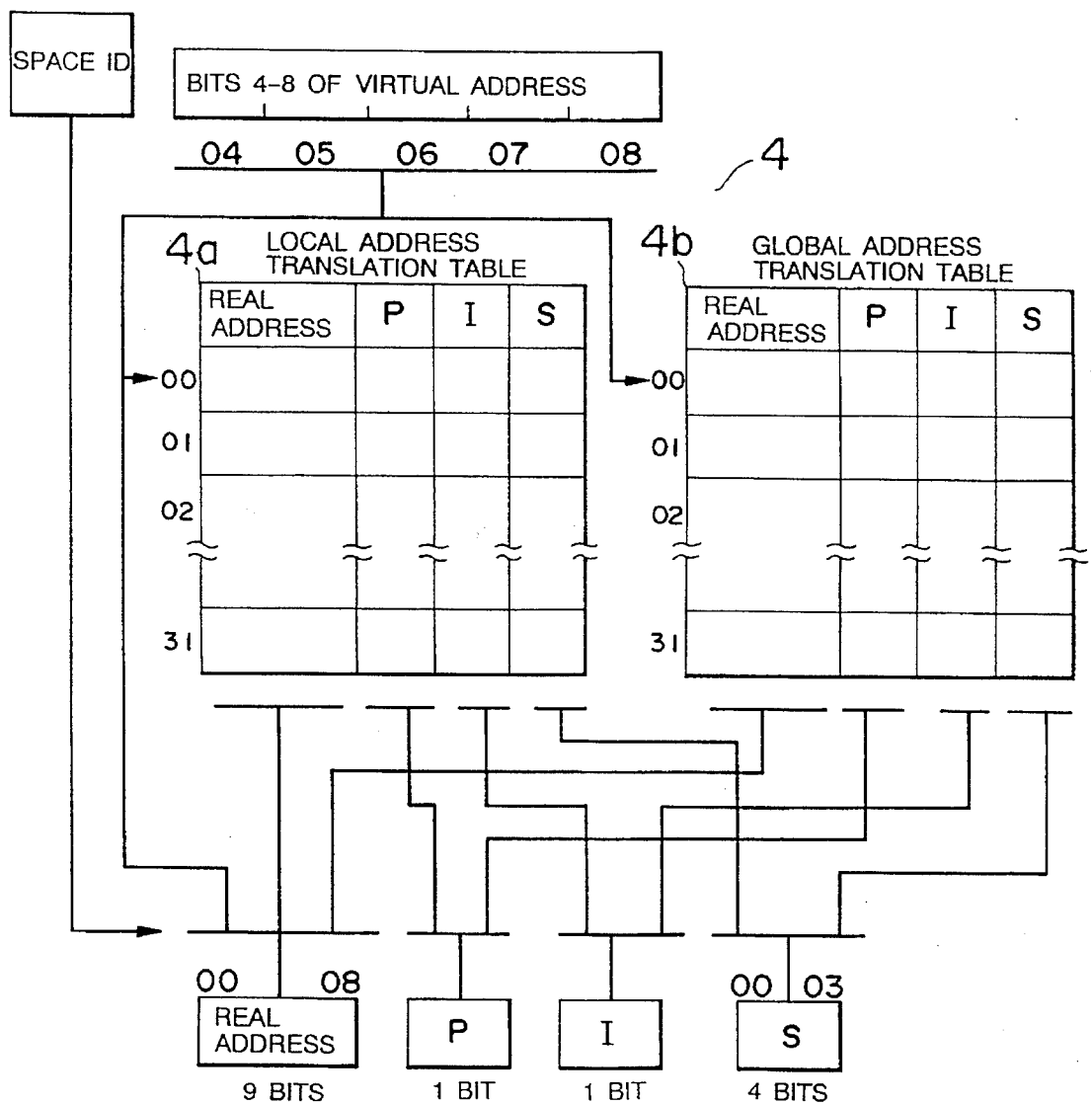
FIG. 10 is a diagrammatic representation of the translation procedure of the address translation table in the system of FIG. 3.

The local address translation table 4a and the global address translation table 4b each have a plurality of entries corresponding in number to bits of a virtual address. FIG. 10 is a diagrammatic representation of the translation process of the address translation table 4. In the example of FIG. 10, of 32 bits of a virtual address, 5 bits from bit 04 to bit 08 are used to search the translation table. Each of the translation tables 4a and 4b has 32 entries numbered from 00 to 31 in correspondence with the 5-bit information. The address translation table 4 selects an entry of the local address translation table 4a and an entry of the global address translation table 4b according to the value of a virtual address sent from the main access control section 6.

Each entry of the translation tables 4a and 4b stores a 4-bit section address, an invalid bit I, an access protection bit P, and a 9-bit real address. The real address represents the high-order 9 bits after address translation of a virtual address.

The 4-bit section address is used for comparison with the high-order 4 bits of a virtual address supplied from the main storage access control section 6. Access to the main storage is granted only when the virtual address matches the section address. Otherwise, an exception is detected.

When the invalid bit I is set to 1 to indicate that the writing or reading of data are invalid, access to a storage area corresponding to the entry will cause an exception to be detected. When the invalid bit is set to 0, data can be written or read.

The access protection bit P is set to 0, read access to the area corresponding to the entry permits data to be read. When the bit P is set to 1, write access will cause an exception to be detected.

When no exception is detected in 32-bit information of an entry corresponding to a virtual address of the entries of the translation tables 4a and 4b, the address translation table 4 outputs the real address, the bits S and P, and the section address I of that entry to the selector circuit 5.

The selector circuit 5 is supplied with the space ID specified by one of headers in the transfer queue 3 via the main storage access control section 6 to select either the local address translation table 4a or the global address translation table 4b.

Figure 12:
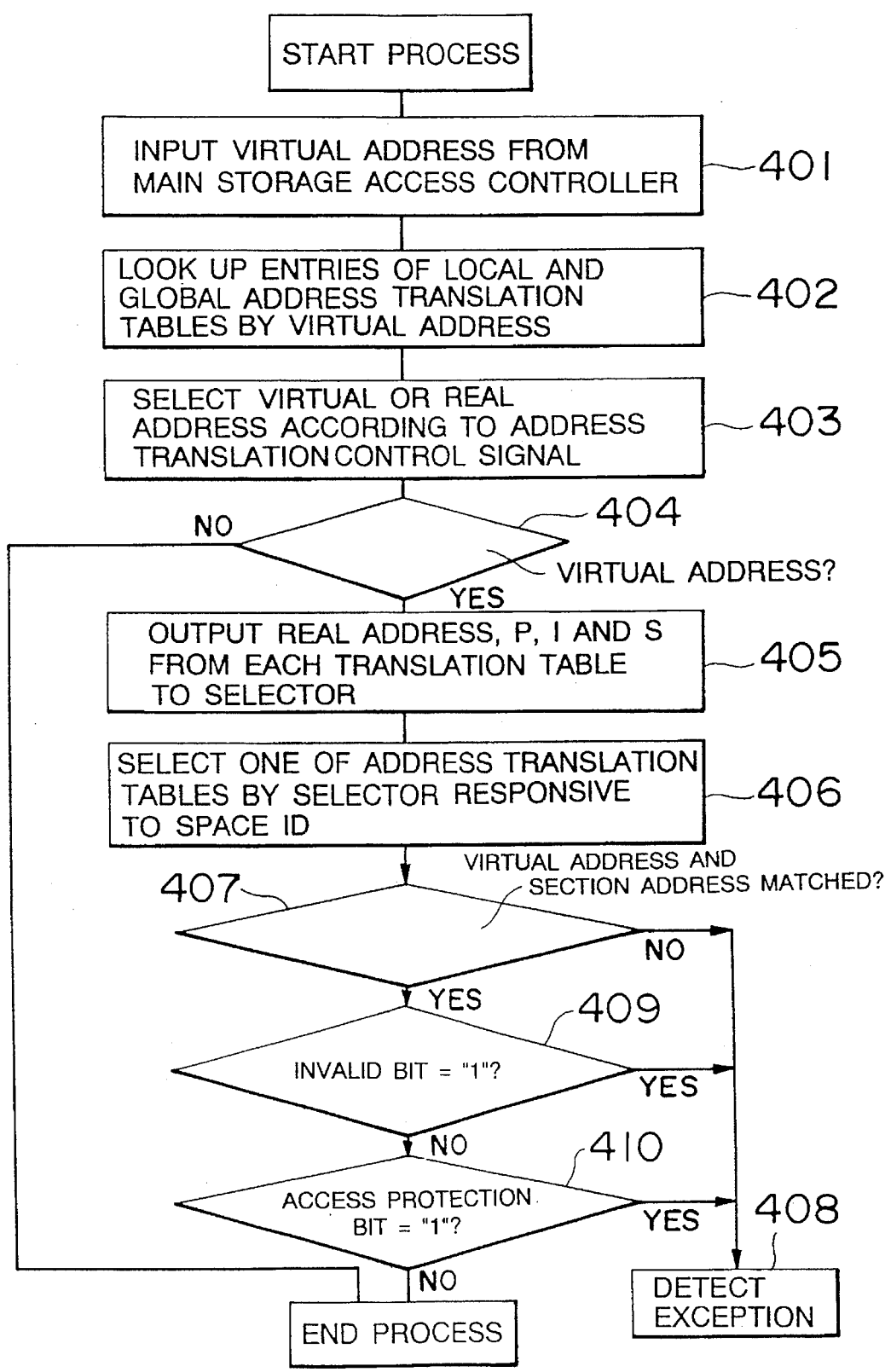
FIG. 12 is a flowchart for the transmission process by the address translation section in the system of FIG. 3.

The selector circuit 24 is supplied with an address translation control signal to select either a translated address from the selector circuit 5 or a virtual address from the main storage access control circuit 6. The selected address by the selector circuit 24 is used as a real address in making access to the main storage 7. FIG. 12 is a flowchart for the address translation by the address translation section 13.

Figure 13:
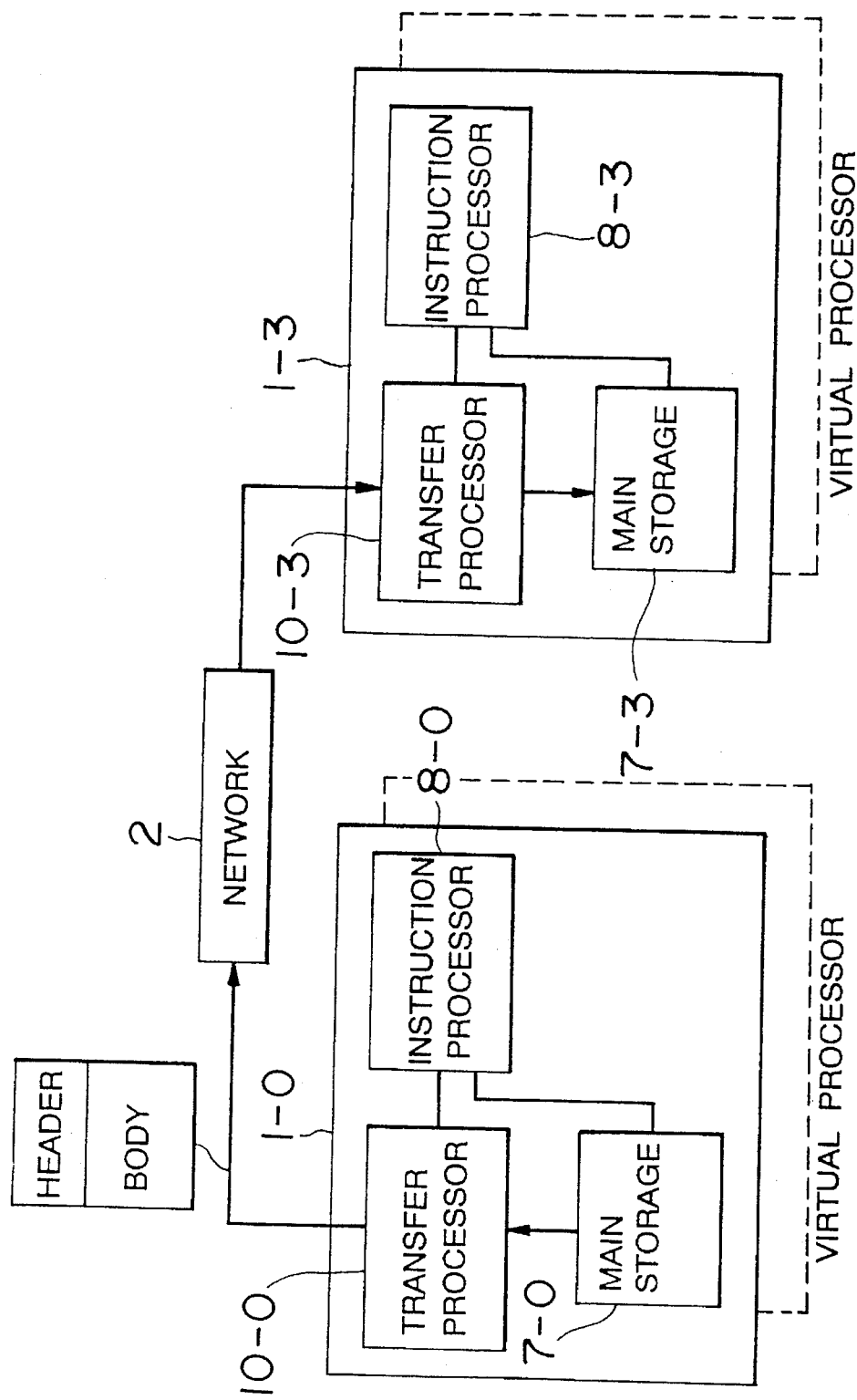
FIG. 13 illustrates a write access operation in the system of FIG. 3.
Figure 14:
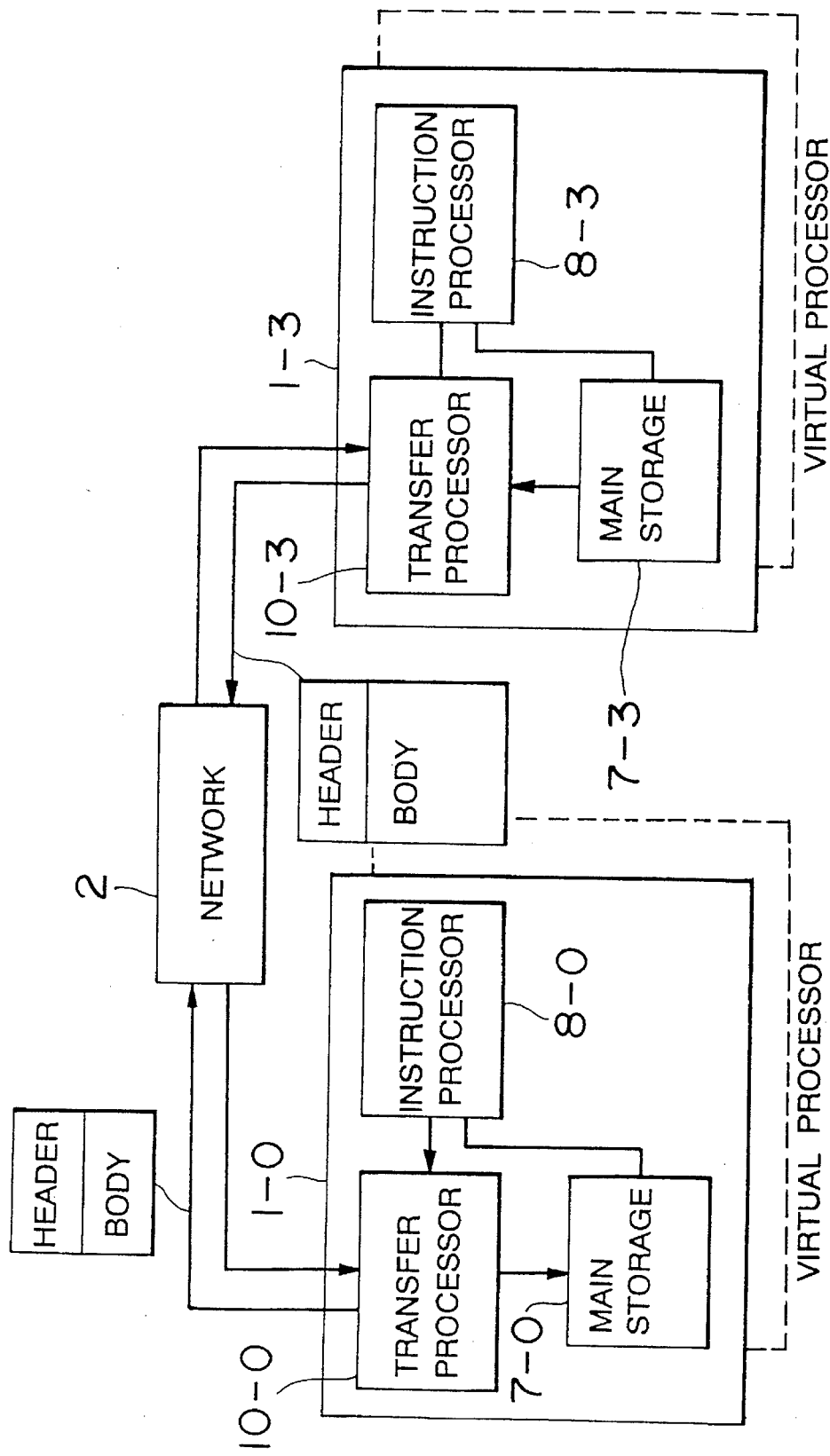
FIG. 14 illustrates a read access operation in the system of FIG. 3.

FIG. 13 is a diagram for use in explanation of the operation of write access, while FIG. 14 is a diagram for use in explanation of the operation of read access.

When write access is made from processor 1-0 to processor 1-3 as shown in FIG. 13, the processing is performed as follows.

When the instruction processing section 8-0 tells the transfer processing section 10-0 to transfer data in the main storage 7-0, the transfer processing section 10-0 reads from the main storage a header and body data in sequence and then transfers them to the network 2 in the packet form. Subsequently, the transfer processing section 10-3 writes the packet into the main storage 7-3.

When read response access is made by processor 1-0 to processor 1-3 as shown in FIG. 14, the following processing is performed. When the instruction processing section 8-0 directs the transfer processing section 10-0 to transfer data in the main storage 7-3, the transfer processing section 10-0 sends to the transfer processing section 10-3 several headers and body data as a read request indicating which data is to be read.

The transfer processing section 10-3 then responds to the request header to read a packet consisting of a header and body data from the main storage 7-3. Then, the transfer processing section 10-0 writes the packet into the main storage 7-0.

The network transfer control section 11 is, as shown in FIG. 6, provided with an LL (local-to-local) authorization control section 30 which controls the authorization of data write or read response between spaces of transmitting and receiving processors.

FIG. 15 is a block diagram of the LL authorization control section. An LL authorization flag section 34 sets an LL authorization flag to 1 to authorize data write or read response between local spaces of transmitting and receiving processors. The flag is reset to 0 to unauthorize data write or read response between local spaces of transmitting and receiving processors.

A write LL unauthorization table 31, corresponding to the LL unauthorization flag "0", is a table into which authorization or unauthorization of the writing of data between the space of a transmitting processor and the space of a receiving processor has been entered.

According to the write LL unauthorization table 31 shown in FIG. 16, the writing of data is disabled when the space of the receiving processor is local.

A read LL unauthorization table 32, corresponding to the LL authorization flag "0", is a table into which authorization or unauthorization of data read response between the spaces of transmitting and receiving processors has been entered. According to the read LL unauthorization table 32 shown in FIG. 17, data is read disabled when the transmitting processor space is local.

In an LL authorization table 33 corresponding to the LL authorization flag "1", information indicating that both of data write and read responses are authorized between spaces of transmitting and receiving processors has been entered. As shown in FIG. 18, the LL authorization table 33 authorizes the writing and reading of data regardless of whether the space of each of transmitting and receiving processors is local or global.

An LL authorization/unauthorization decision section 35 refers to the LL authorization flag from the LL authorization flag section 34, a write/read response transfer mode, a transmit space ID, and a receive space ID to select one of the tables 31, 32 and 33, thereby making a data transfer authorization/unauthorization decision.

<Operation>

Figure 19:
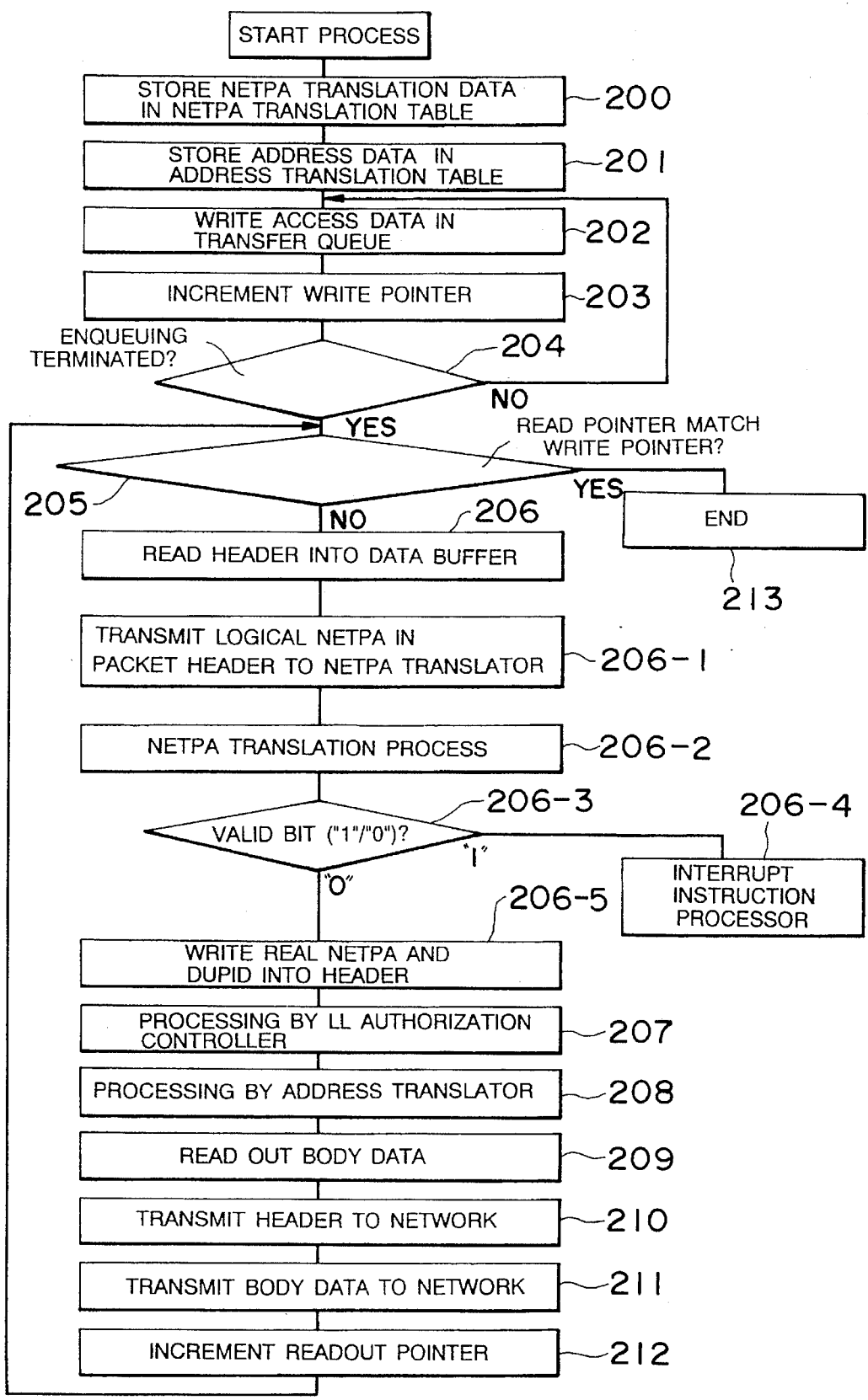
FIG. 19 illustrates a process flow in the system of FIG. 3.

FIG. 19 is a flowchart for the processing by the present embodiment. The operating system 73 stores NETPA translation information in the NETPA translation table in the NETPA translation section prior to the execution of instructions of the user program 72 or as requested by the program 72 (step 200).

Likewise, address translation information is stored in each of the entries of the address translation table 4 (step 201).

The instruction processing section 8, which executes instructions of the user program 72, writes information on receiving processor specification, body data length, transmit address, receive address, transmit space ID, receive space ID and some other information as access information for data transfer request into the transfer queue in the main storage 7 in the packet header form as shown in FIG. 5 (step 202). The position of the transfer queue 3 in the main storage 7 is represented by $$\text{position} = \text{transfer queue base address} + \text{transfer queue write pointer} \times \text{header length}$$

Next, the instruction processing section 8 increments write pointer values in the transfer queue write pointer sections 16-1 and 16-2 (step 203).

Subsequently, the instruction processing section 8 repeats the writing of access information for transfer requests into the transfer queue 3 and the incrementing of the transfer write pointer sections 16-1 and 16-2 and then makes a decision of whether the writing into the transfer queue 3 (enqueuing) has been completed or not (step 204).

The network transfer control section 11 is activated by a command from the instruction processing section 8 to wait for the completion of the enqueuing for transfer requests.

Next, when the instruction processing section 8 completes the enqueuing, the network transfer control section 11 makes a decision of whether or not the transfer queue read pointer value matches the transfer queue write pointer value (step 205).

When no match is found between the pointer values, the network transfer control section 11 restarts the transfer processing on the basis of determination that at least an outstanding transfer request still remains and then issues a main storage access request to the main storage access control section 6 for reading a transfer packet header.

The main storage access control section 6 computes the address on the main storage 7 for the packet header for the oldest outstanding transfer request and then makes read access to the transfer queue 3 in the main storage 7 via the address translation section 13.

When the packet header is read from the transfer queue 3 in the main storage 7, the main storage access control section 12 stores that packet header in the data buffer 12 and then informs the network transfer control section 11 of the termination of the reading of the packet header (step 206).

Figure 20:
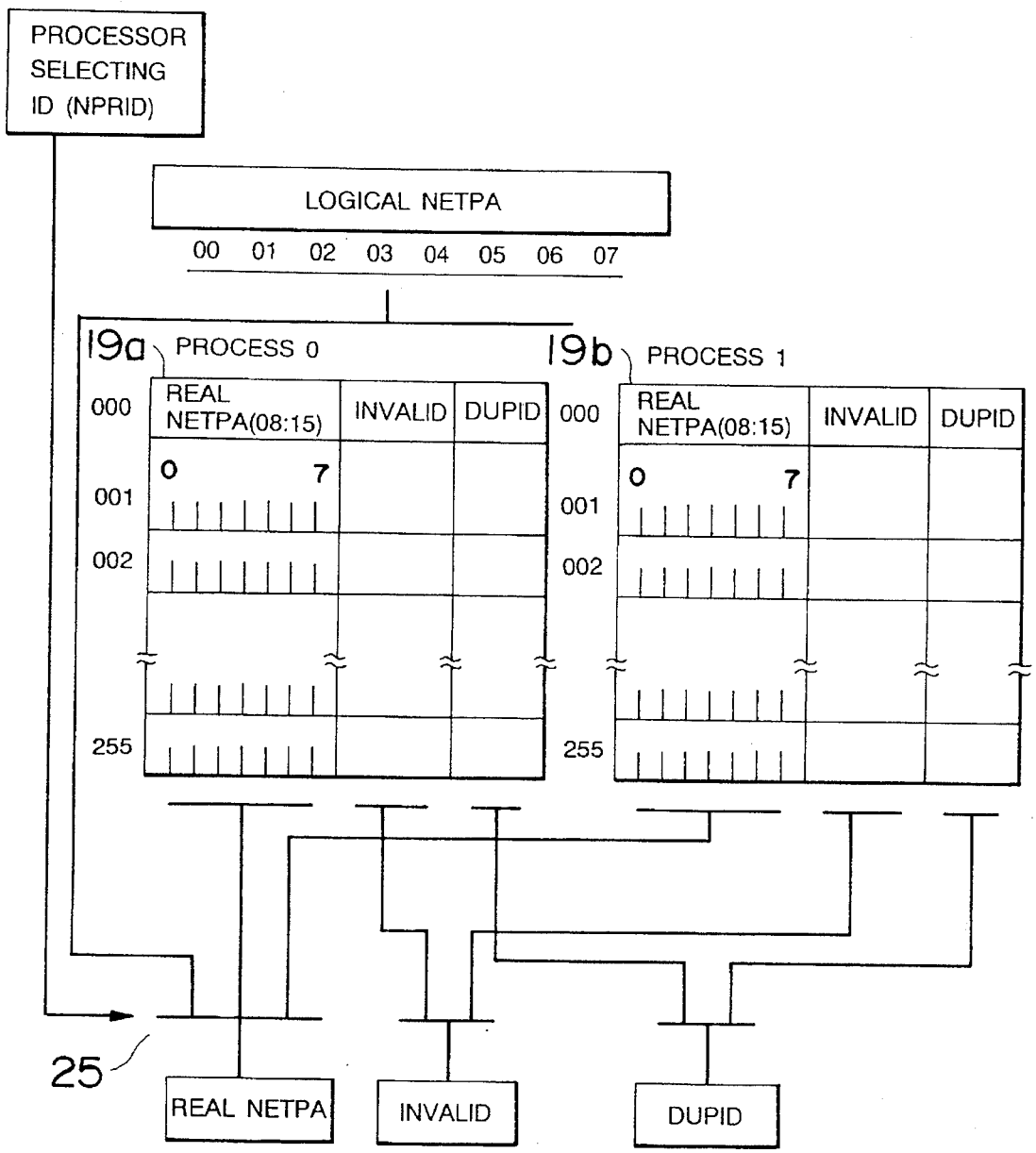
FIG. 20 is a diagram for use in explanation of the NETPA transation process in the system of FIG. 3.

The network transfer control section 11 reads the logical NETPA from the packet header and transmits it to the NETPA translation section with the transmitting user process ID (step 206-1). The NETPA translation section refers to the translation table corresponding to the transmitting user process ID for NETPA translation (step 206-2). For example, if, in FIG. 20, the user process ID is 0 and the logical NETPA is 002, the left-hand table of FIG. 20 is referred to, so that the real NETPA corresponding to the logical NETPA, the contents of the invalid bit and the receiving-processor-side virtual processor ID are output.

The status of the invalid bit is detected (step 206-3). If the invalid bit is 1, then the network transfer control section detects an exception and then interrupts the instruction processing section with notification (step 206-4).

If the invalid bit is 0, it is judged that transfer is possible with the result that real NETPA (real receiving processor specification) and DUPID (virtual processor number within receiving processor) are written into the header portion of the data buffer (step 206-5).

Thereby, the transfer queue becomes as shown in the right-hand portion of FIG. 5. Subsequently, the network transfer control section requests the main storage access section to transfer body data.

The main storage access section fetches transfer control information, such as transmit and receive addresses, to compute the address of the packet body and makes read access to the main storage via the address translation section. The main storage access control section stores packet bodies read from the main storage in the data buffer in sequence and informs the network transfer control section of the amounts of the packet body data read. When informed of the amounts of packet bodies read by the main storage access control section after packet headers are transmitted from the data buffer to the network, the network transfer control section transmits the packet bodies stored in the data buffer to the network in sequence. At the termination of transmission of the packets to the network, the network transfer control section increments the transfer queue read pointer. Subsequently, the network transfer control section examines the transfer queue read pointer value and the transfer queue write pointer value and, if an outstanding transfer request is left, starts transfer processing. The transfer processing is repeated until the transfer queue read pointer value matches the transfer queue write pointer value. During the transfer processing the physical processor responds to the instruction processing section to perform other processes.

The following control operations are performed for transfer processing.

The main storage access control section 6 reads the transfer mode, the transmit space ID and the receive space ID from a header stored in the data buffer 17. The LL authorization control section 30 in the network transfer control section 11 refers to the transfer mode, the transmit space ID, the receive space ID and the LL authorization flag to enable or disable data transfer in accordance with the tables 31 to 33 (step 207).

Figure 21:
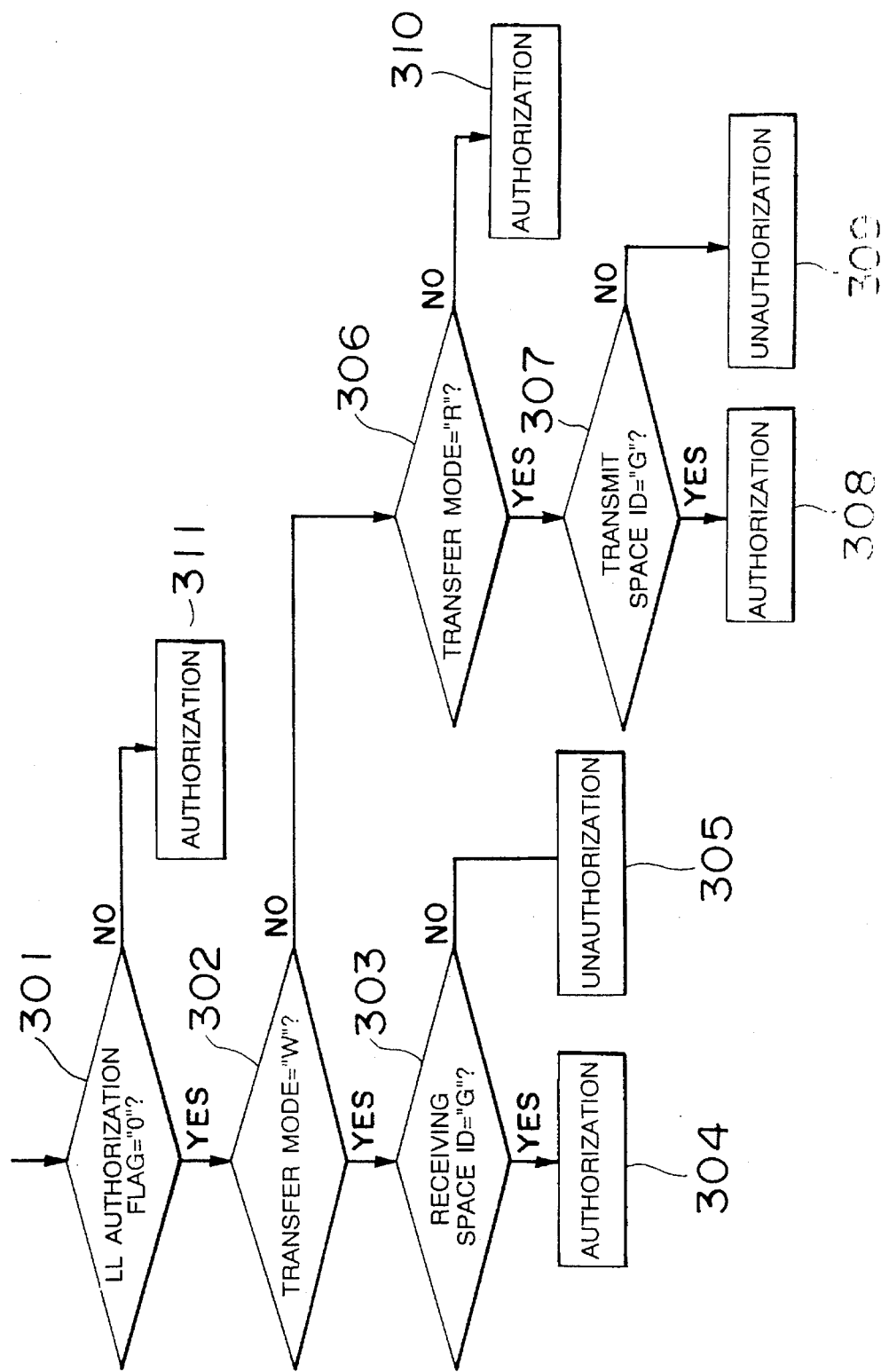
FIG. 21 illustrates a process flow in the LL determining section in the system of FIG. 3.

FIG. 21 shows a process flow in the LL authorization/unauthorization decision section 35. The LL authorization/unauthorization decision section makes a decision of whether or not the LL authorization flag is 0 (step 301). If the LL authorization flag is 0, then the LL authorization/unauthorization decision section 35 makes a decision of whether or not the transfer mode is a write (W) mode (step 302).

If the transfer mode is a write mode, then a decision is made as to whether or not the receive space ID is global (step 303). If the receive space ID is global, then the write LL unauthorization table 31 is referred to, so that the receiving processor is write enabled (step 304).

If, on the other hand, the receive space ID is local, reference is made to the write LL unauthorization table 31 to write disable the receiving processor (step 305).

If the transfer mode is a read (R) mode in step 306, a decision is made as to whether or not the transmit space ID is global (step 307). If the transmit space ID is global, then reference is made to the read LL unauthorization table 32 to read enable the transmitting processor (step 308). If, on the other hand, the transmit space ID is local, the transmitting processor is read disabled in accordance with the read LL unauthorization table 32 (step 309). If the transfer mode is not a read response (R), the transmitting processor is read enabled (step 310).

No local space is normally specified as where data is written into or where a read response is written into. Thus, the LL authorization flag is set to 0. If data transfer is specified, therefore, an exception is generated to thereby permit protection against the intentional or program-error-dependent destruction of space.

If, on the other hand, the LL authorization flag is 1, the writing or reading of data is allowed according to the LL authorization table 33 (step 311).

The restriction that data transfer between local spaces is inhibited may hinder the execution of high-speed data processing based on program optimization. In this case, the LL authorization flag is set to 1, thereby permitting data transfer between local spaces. This eliminates data transfer overhead, permitting high-speed program execution.

When it is decided by the authorization/unauthorization decision section 35 that data transfer is disallowed, the network transfer control section 11 inhibits the data transfer and interrupts the instruction processing section 8 for notification.

If, on the other hand, data transfer is allowed by the authorization/unauthorization decision section 35, access information required for transfer, such as transmit and receive addresses, is fetched, the address of body data of a packet is computed, and read access is made to the main storage 7 via the address translation section 13.

At this point, the address translation section 13 performs such processing as shown in FIG. 12. The address translation section 13 first receives a virtual address from the main storage access control section 6 (step 401). The virtual address is used to search the local address translation table 4a and the global address translation table 4b for entries (step 402).

Next, the selector circuit 24 is responsive to an address translation control signal, indicating whether or not address translation from virtual address to real address is to be made, to select either the translated address from the selector circuit 5 or the virtual address from the main storage access control section 6 (step 403). The selected address serves as a real address used in making access to the main storage 7.

Further, a decision is made as to whether or not the selected address is the virtual address (step 404). If the selected address is not the virtual address, then the processing terminates.

If, on the other hand, the selected address is the virtual address, then the address translation table 4 outputs real addresses, P, I and S from entries of the translation tables 4a and 4b (step 405).

Next, the selector circuit 5 responds to the space ID from the main storage access control section 6 to select either the local address translation table 4a or the global address translation table 4b (step 406).

A decision is made as to whether or not a match exists between the high-order 4 bits of the virtual address and the 4-bit section address (step 407). If no match exists, then an access exception for the main storage 7 is detected (step 408).

If, on the other hand, a match exists, then a decision is made as to whether or not the invalid bit is 1 (step 409). If the bit is 1, then a data writing/reading exception is detected (step 408).

If, on the other hand, the invalid bit is 0, a decision is made as to whether or not the access protection bit is 1 (step 410). If the protection bit is 1, then an exception will be detected when write access is made (step 408).

If the access protection bit is 0, then access to the area corresponding to the entry permits data to be read out, thus terminating the processing.

Suppose here that the global space address translation table 4b is selected by the space ID. In this case, since the global space is common to the processors, all the processors must be synchronized with one another in rewriting address translation information in the global address translation table 4b.

In contrast, suppose that the local space address translation table 4a is selected by the space ID. In this case, since local space is inherent in each processor, address translation information in the local address translation table 4a can be rewritten independently of the other processors. The rewriting of the local address translation table 4a only will eliminate the need for synchronization of the processors. This permits the address translation tables to be rewritten with less overhead. Note that the local address translation table 4a is rewritten more frequently than the global address translation table 4b.

In this manner the local address translation table 4a or the global address translation table 4b is selected. Each time a virtual address is translated to a real address by the selected translation table, body data of a packet is read from the main storage 7. Then, the main storage access control section 6 stores the body data in the data buffer 17 and informs the network transfer control section 11 of the amount of the body data thus read (step 209).

Upon being informed of the termination of readout of packet headers by the main storage access control section 6, the network transfer control section 11 fetches transfer request access information from the data buffer 17, examines it, adds changes to it, and then returns it to the data buffer 17.

Next, the network transfer control section 11 sends a packet header from the data buffer 17 to the network 2 (step 210). When the network transfer control section 11 is informed of the amount of read packet body data by the main storage access control section 6, the section 11 sends the packet body data stored in the data buffer 17 to the network 2 (step 211).

When the transmission of a packet from the transfer processing section 10 to the network 2 is thus terminated, the network transfer control section 11 increments the transfer queue read pointer (step 212) and then returns to step 205. The network transfer control section 11 makes a comparison between the transfer queue read and write pointer values. If no match is found, that is, if outstanding transfer requests remain, then another transfer request is processed (steps 206 to 212). The data transfer processing is repeated until a match is found between the transfer queue read pointer and the transfer queue write pointer. When the pointers become equal to each other, the data transfer processing is terminated (step 213).

Thus, the provision of two virtual spaces, global space and local space, in a data transfer processing device which permits data communications among a plurality of processors permits each space to be used independently. Although the updating of the global address translation table 4b needs synchronization among processors, the updating of the local address translation table 4a saves the need for synchronization among processors, thus reducing OS overhead.

Moreover, in the case of write transfer, inhibiting the writing into local space will protect the local space. Furthermore, by controlling the LL authorization flag, a program is allowed to perform local-to-local data transfer, thereby reducing the overhead for data transfer, while another program is disallowed to write into local space. This will protect local space with flexibility according to programs.

It goes without saying that, in either of writing and reading, virtual processors or physical processors may be specified.

What is claimed is:

1. A virtual processor system comprising:

a plurality of processor to execute processes in parallel including respective virtual processors and storing a plurality of logical processor numbers corresponding to destination processors of said plurality of processors;

main storage means, associated with said plurality of processors for storing data and system information; and transfer processing means for transferring said data and system information among said plurality of processors by selecting a destination logical processor number of said plurality of logical processor numbers corresponding to a processor and a respective virtual processor of said plurality of processors, reading said data and system information from said main storage together with said processor and said respective virtual processor corresponding to said selected destination logical processor number and transferring said read data and system information to at least one of said processor and said respective virtual processor; wherein said transfer processing means associates said destination logical processor number with a physical processor valid flag, and when said physical processor valid flag indicates an invalid state, cancels communication of data designating the processor and, when said physical processor valid flag indicates a valid state, starts communication of data designating the processor.

2. A system according to claim 1, wherein said processors execute processes differing from said process in a transfer requesting processor during said data and system information transfer.

3. A system according to claim 1, wherein said transfer processing means associates said destination logical processor number with said processor, said respective virtual processor and a within-physical-processor virtual processor valid flag, and, when said virtual processor valid flag indicates an invalid state, cancels communication of data designating the processor and, when said virtual processor valid flag indicates a valid state, starts communication of data designating the virtual processor.

4. A data transferring device comprising:

a plurality of processors each having a data storage and performing predetermined processing; and communication means for permitting transfer of data and system information among said plurality of processors, each of said plurality of processors including:

system information storage means for storing access information for data transfer associated with said data, said access information including process identification data for identifying a group of said plurality of processors to execute a program and a destination logical processor number;

a plurality of processor translating means for translating said destination logical processor numbers stored in said system information storage means to physical processors and virtual processors in correspondence with said process identification data; and transfer control means, responsive to said physical and virtual processors translated by said processor translating means, for reading data from said data storage and transferring said read data with said access information to at least one of said physical and virtual processors;

wherein said transfer control means performs data transfer processing using a packet having a header including said physical processor, said virtual processor, said access information, and body data associated with said header.

5. A method for permitting a plurality of processors to perform parallel processing by permitting transfer of data and system information among said processors which have respective virtual processors established within them and relate actual physical processors and said virtual processors to form a plurality of logical processors as a whole, said data transfer processing method comprising the steps of:

storing access information for transferring of data including process identification data for identifying a group of said plurality of processes to execute a program and a destination logical processor number in system information storage;

translating said destination logical processor number to a physical processor number and a virtual processor number in correspondence with said process identification data; and transferring data read from a data storage and said access information to at least one of physical and virtual processors in accordance with said physical and virtual processor numbers;

wherein said transferring step performs data transfer processing using a packet having a header including said physical processor number, said virtual processor number, said access information, and body data associated with said header.

6. A data transferring device comprising:

a plurality of processor each having a data storage and performing predetermined processing; and communication means for permitting transfer of data and system information among said plurality of processors, each of said plurality of processors including:

system information storage means for storing access information for data transfer associated with said data, said access information including destination logical processor numbers;

a plurality of processor translating means for translating said destination logical processor numbers stored in said system information storage means to physical processor numbers and virtual processor numbers in correspondence with a process; and transfer control means, responsive to said physical and virtual processor numbers translated by said processor translating means, for reading data from said data storage means and transferring said read data with said access information to at least one of physical and virtual processors;

wherein said transfer control means performs data transfer processing using a packet having a header including said physical processor number, said virtual processor number, said access information, and body data associated with said header.

\* \* \* \* \*